July 18, 1933.                R. S. TAYLOR                1,918,352
ABSORPTION REFRIGERATING APPARATUS
Filed Jan. 30, 1931
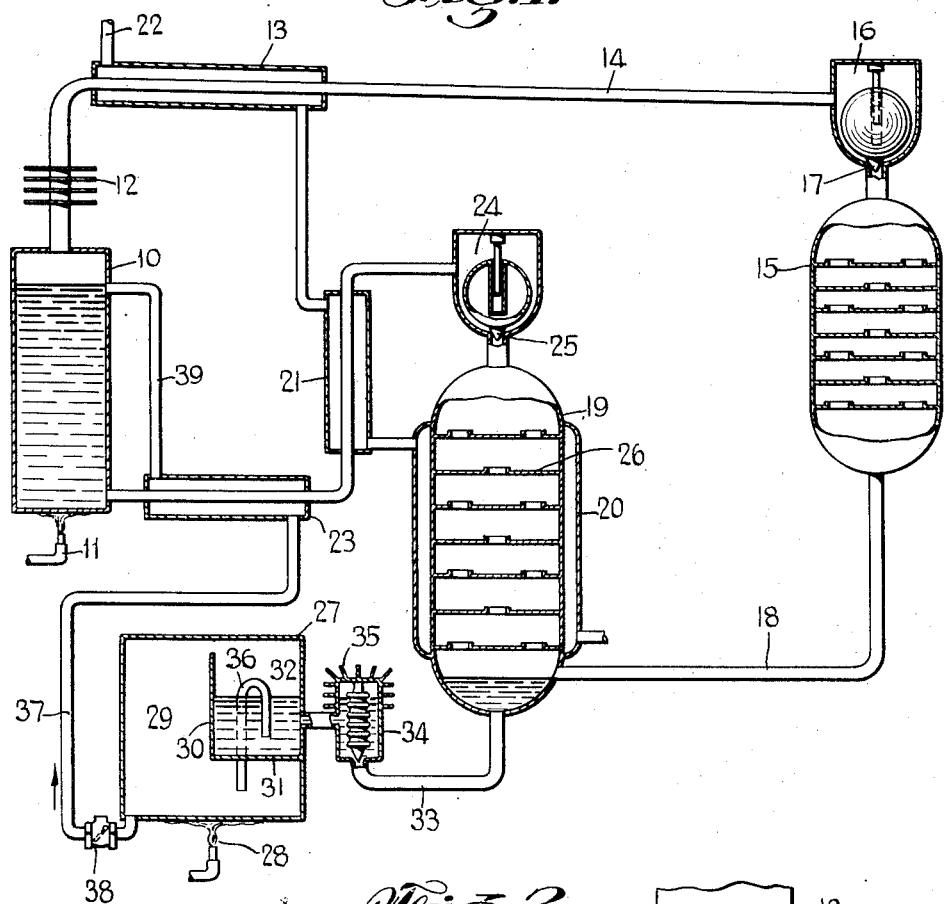
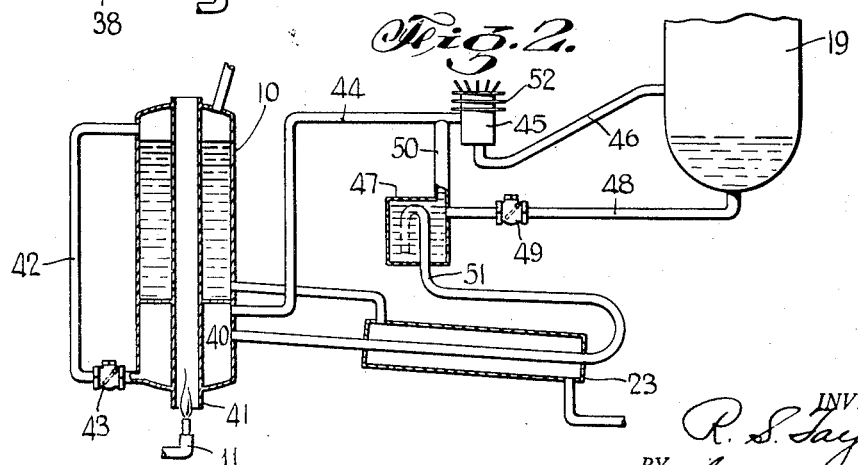
INVENTOR.
R. S. Taylor
BY
ATTORNEY.

Patented July 18, 1933

1,918,352

UNITED STATES PATENT OFFICE

ROBERT S. TAYLOR, OF EVANSVILLE, INDIANA, ASSIGNOR TO ELECTROLUX SERVEL CORPORATION, OF NEW YORK, N. Y., A CORPORATION OF DELAWARE

ABSORPTION REFRIGERATING APPARATUS

Application filed January 30, 1931. Serial No. 512,307.

This invention relates to refrigerating systems of the absorption type and more particularly to the transfer of absorption liquid from the absorber to the generator in a continuous type absorption refrigerating apparatus.

In order to operate an absorption refrigerating apparatus continuously it is advisable either to circulate a pressure equalizing medium such as hydrogen which is used in refrigerating apparatuses known in commerce as the "electrolux", or provide a positive pressure pump for transferring strong absorption liquid from the absorber to the generator. The pressure against which the liquid must be transferred depends on the cooling water temperature in the condenser.

The use of a pressure equalizing medium is satisfactory for small size installations where all the parts are located close together, but for large size installations for use in markets and similar places, or for any installation where the generator and absorber must be separated from the evaporator, such a system is not suitable.

It is possible to use a mechanical pump for pumping the liquid from the absorber to the generator and such a pump is now used in large commercial installations but is not suitable for smaller installations on account of service requirements for the moving parts. In addition, such a pump requires a motor for its operation so that most of the advantages of the absorption type refrigerating apparatus are lost. The desirable type of pump is a heat operated pump which has no external moving parts.

It is an object of this invention to provide in a refrigerating system of the continuous absorption type a heat operated pump for circulating the liquid between the generator and absorber, which pump has no external moving parts and which will require little or no servicing. Other objects and advantages will be apparent from the following description taken in connection with the accompanying drawing wherein, Fig. 1, is a diagrammatic view of an absorption refrigerating apparatus of the continuous type including a pump arrangement contemplated by this invention; and Fig. 2, a diagrammatic view of a modified pumping arrangement by which the generator heating means is also used to heat the pump chamber.

Referring to Fig. 1 of the drawing, a generator 10 is adapted to contain a solution of refrigerant in an absorption liquid, which for the purposes of this description may be a water solution of ammonia, and is heated by any desirable means such as a burner 11. Ammonia vapor expelled from solution in the generator 10 by heat passes through rectifier 12 and into condenser 13. Liquid ammonia from the condenser flows through conduit 14 and is admitted into the evaporator 15 from chamber 16 through float valve 17. In the evaporator the liquid ammonia vaporizes, absorbing heat from the surrounding medium, and the ammonia vapor passes through conduit 18 into the absorber 19. The absorber 19 and the condenser 13 may be cooled by water circulating through jacket 20 around the absorber, through weak liquid cooler 21, and into the condenser 13, going to waste through pipe 22. Weak absorption liquid from the generator 10 passes through the heat exchangers 23 and 21 into chamber 24 from where it is admitted into the absorber 19 through a float valve 25. The ammonia vapor rising through the baffle plates 26 in the absorber 19 is absorbed by the descending weak liquid and enriched absorption liquid collects in the bottom of the absorber.

In order to pump enriched absorption liquid from the absorber into the generator there is provided a fluid tight vessel 27 inclosing a chamber 29 and heated by some means such as a gas burner 28. Within the chamber 29 plates 30 and 31 partition off a chamber which communicates with chamber 29 over the top of partition plate 30. Chamber 32 communicates with the bottom of the absorber 19 through conduit 33 in which there is a normally open heat operated valve 34 provided with heat radiating fins 35. A siphon 36 extends from within chamber 32 into chamber 29 and the latter communicates with the generator through conduit 37 in which there is a check valve 38, heat exchanger 23, and conduit 39.

In operation, enriched absorption liquid from the absorber flows through the open valve 34 into chamber 32. When the liquid in chamber 32 rises a sufficient height it siphons through pipe 36 into the heated chamber 29 and partially vaporizes. The resulting vapor pressure in chamber 29 forces the liquid contained in the chamber 32 back through the valve 34 toward the absorber. The hot vapors coming in contact with the bellows or other means in the heat operated valve 34 causes the latter to close. Pressure is then built up in chamber 29 and the liquid is expelled through check valve 38, heat exchanger 23, and conduit 39 into the generator 10.

When all the liquid has been expelled from chamber 29 there is no source of hot vapor for heating the valve 34 to maintain it in its closed position. Due to the poor heat conductivity of the vapor in chamber 29 and the radiation of heat through the fins 35, the valve 34 will cool and the pressure drop in chamber 29 allows the check valve 38 to close. Upon cooling, the valve 34 opens, permitting absorption liquid from the absorber to enter which further cools the valve causing it to open wide and the cycle is again repeated.

The heat operated valve 34 may be of any desired type of which there are several used in commercial practice at the present time. The exact arrangement of parts is not essential and may be modified, for instance, as shown in Fig. 2 of the drawing which illustrates an arrangement whereby the pump chamber may be heated by the same source of heat used to heat the generator. In this arrangement the generator 10 is provided with an additional chamber 40 and both the generator and the chamber 40 may be heated by some means such as a burner 11 in a flue 41 which extends through both the generator and the chamber 40. The lower part of chamber 40 is connected to the generator through a conduit 42 in which there is a check valve 43. The upper part of chamber 40 is connected to the absorber 19 through conduit 44, heat operated valve 45 and conduit 46. Valve 45 is similar to the valve 34 described in connection with the system shown in Fig. 1. A fluid tight vessel 47 is connected to the absorber 19 through conduit 48 in which there is a check valve 49 and the upper part of the vessel is connected to the valve 45 through conduits 50 and 44. A siphon 51 within vessel 47 communicates with the pump chamber 40 through heat exchanger 23.

In operation, enriched absorption liquid flows from the absorber 19 through the check valve 49 into vessel 47 in which the liquid level rises until the siphon is started. The enriched liquid flows through the heat exchanger 23 into the chamber 40. Both in the heat exchanger 23 and the chamber 40 ammonia vapor is generated which starts to flow into the absorber through conduit 44, valve 45 and conduit 46, but when the hot gas reaches the valve 45 the latter closes responsive to the heat. Pressure increases in the pumping system and absorption liquid is forced out of chamber 40 through check valve 43 and conduit 42 into the generator. In this manner the liquid has been transferred from the low pressure of the absorber into the generator against the high pressure therein.

When there is no longer any liquid in chamber 40 to absorb the heat from the flue 41 this heat will be absorbed to expel ammonia vapor from solution in the generator 10 and at the same time the valve 45 cools due to the radiation of heat by the fins 52 and the poor heat conductivity of the vapor. Cooling of the valve 45 may be accomplished either by heat radiation from a large surface as shown or by the circulation of cooling water if desired. Upon cooling, valve 45 opens, relieving the pressure in chamber 40 into the absorber 19 and absorption liquid can again flow into the vessel 47 and the cycle is repeated.

With this arrangement the heat from the burner 11 is automatically divided between the chamber 40 and the generator 10, that is, when there is liquid in the chamber 40, that is the coolest spot in the area subjected to heat and absorbs heat from the burner, but during the low pressure part of the pumping cycle the generator 10 is the coolest part of the heated area and absorbs heat from the burner.

It will be obvious to those skilled in the art that various other changes may be made in the construction and arrangement without departing from the spirit of the invention and therefore the invention is not limited to what is shown in the drawing and described in the specification but only as indicated in the appended claims.

I claim:

1. In a refrigerating apparatus of the continuous absorption type, means for transferring absorption liquid from the absorber to the generator, said means including a heated vessel and a heat operated valve connected respectively in series between the generator and the absorber.

2. In an absorption refrigerating system of the continuous type, means for transferring liquid from the absorber to the generator, said means comprising a fluid tight vessel, an open top liquid container within said vessel, a siphon from said container into said vessel, a heat operated valve connected between the absorber and said container, and a connection between said vessel and the generator.

3. In a refrigerating system of the continuous absorption type, a generator, a fluid tight vessel, a common heating means for said generator and said vessel, a fluid connection between said vessel and said generator, an absorber, a conduit between said vessel and said absorber, a heat operated valve in said conduit, a fluid tight container connected to the absorber, and a siphon connection between said container and said vessel.

4. In a continuous absorption refrigerating system, a generator including a boiler chamber, a pump chamber, heating means for said chambers, a conduit between said chambers, and a check valve in said conduit, an absorber, a heat operated valve connected between said pump chamber and the absorber, a closed container connected to the absorber through a check valve, and a siphon in said container and connected to said pump chamber.

5. In refrigerating apparatus of the continuous absorption type, means for transferring absorption liquid from the absorber to the generator comprising a liquid accumulating chamber, a continuously heated chamber, a siphon for discharging liquid from the first to the second said chamber, a conduit for liquid from the absorber to the first said chamber, a thermal responsive valve in said conduit, a second conduit from said heated chamber to the generator, and a pressure responsive valve in last said conduit.

6. In refrigerating apparatus of the continuous absorption type, means for transferring absorption liquid from the absorber to the generator comprising a liquid accumulating chamber connected to receive liquid from the absorber through a back pressure check valve, a continuously heated chamber connected to discharge liquid to the generator through a second back pressure check valve, a siphon for conducting liquid from the first to the second said chamber, a pressure equalizing conduit between said chambers, a pressure relief conduit from said chambers to said absorber, and a thermal responsive valve in last said conduit.

7. In refrigerating apparatus of the continuous absorption type, an absorption liquid circuit from the absorber to the generator segregated between check valves and having a liquid accumulating portion and a continuously heated portion, a siphon for delivering liquid from said liquid accumulating portion to said heated portion, and normally open pressure relief means for said circuit adapted to close upon a predetermined rise in temperature.

ROBERT S. TAYLOR.